United States Patent
Smith et al.

(10) Patent No.: US 8,955,940 B1
(45) Date of Patent: Feb. 17, 2015

(54) SYSTEM AND METHOD FOR PRINTING COLORS OUTSIDE OF A LIMITED GAMUT

(71) Applicant: Xerox Corporation, Norwalk, CT (US)

(72) Inventors: Mark A. Smith, Rochester, NY (US); Katherine Loj, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/227,326

(22) Filed: Mar. 27, 2014

(51) Int. Cl.
*B41J 2/205* (2006.01)
*B41J 2/21* (2006.01)
*B41J 2/045* (2006.01)

(52) U.S. Cl.
CPC ............ *B41J 2/2103* (2013.01); *B41J 2/04501* (2013.01)
USPC ............................................. 347/15; 347/19

(58) Field of Classification Search
CPC ... H04N 1/6033; H04N 1/60; H04N 1/00002; H04N 1/00015; H04N 1/6055; B41J 2/205; B41J 2/2142; B41J 2/2056; G01J 3/52; G01J 3/46
USPC ........................................ 347/14, 15, 19, 43
See application file for complete search history.

(56) References Cited

U.S. PATENT DOCUMENTS

| | | |
|---|---|---|
| 7,050,196 B1 | 5/2006 | Piatt et al. |
| 7,715,042 B2 | 5/2010 | Yoshizawa et al. |
| 7,791,776 B2 | 9/2010 | Nielsen et al. |
| 7,933,053 B2 | 4/2011 | Dalal et al. |
| 7,990,592 B2 | 8/2011 | Mestha et al. |
| 8,179,566 B2 | 5/2012 | Mestha et al. |
| 8,310,717 B2 * | 11/2012 | Ochs et al. ..................... 358/1.9 |
| 8,395,831 B2 | 3/2013 | Qiao |
| 8,422,103 B2 | 4/2013 | Qiao et al. |
| 2005/0030560 A1 | 2/2005 | Maltz et al. |
| 2007/0097389 A1 | 5/2007 | Morovic |
| 2009/0122325 A1 | 5/2009 | Farrell et al. |
| 2009/0296113 A1 | 12/2009 | Mestha et al. |
| 2010/0165364 A1 | 7/2010 | Qiao |
| 2013/0100466 A1 | 4/2013 | Fischer et al. |
| 2013/0107291 A1 | 5/2013 | Kuehn |

* cited by examiner

*Primary Examiner* — Thinh Nguyen
(74) *Attorney, Agent, or Firm* — Maginot Moore & Beck LLP

(57) ABSTRACT

A method of operating a printer includes identifying coordinates in a device independent color space for a spot color, identifying color components in a device dependent full color profile in a printer model for an association between the spot color in the device independent color space and a device dependent color space, and emitting a pattern of colorants with reference to the color components to reproduce the spot color in a printed image. The colorant pattern has a colorant density exceeding a predetermined colorant limit threshold associated with printed colors other than spot colors.

18 Claims, 3 Drawing Sheets

SYSTEM AND METHOD FOR PRINTING COLORS OUTSIDE OF A LIMITED GAMUT

TECHNICAL FIELD

This disclosure relates generally to color printing systems, and, more particularly, to methods for printing multi-colored images using a combination of ink colors.

BACKGROUND

A typical inkjet printer uses one or more printheads to form an ink image on an image receiving surface. Each printhead typically contains an array of individual inkjets for ejecting drops of ink across an open gap to the image receiving surface to form an ink image. The image receiving surface may be on a continuous web of recording media, a series of media sheets, or on a rotating image receiving member, such as a print drum or endless belt. Images printed on a rotating surface are later transferred to recording media by mechanical force in a transfix nip formed by the rotating member and a transfix roller.

Modern inkjet printers typically receive digital image data in a variety of formats and form ink images on a print medium that reproduce the original digital image. One challenge in forming printed images includes the accurate reproduction of colors in a physically printed image from the digital image data. For example, the digital image data are often encoded in a format that is unsuitable for direct operation of inkjets in the printer. Instead, the digital image data are encoded in either a device-independent color space, such as L*a*b*, or are encoded in a digital format such as the red, green, blue (RGB) that is associated with display screens rather than printed images. The printer or an intermediate computing device converts the digital image data into a data format that corresponds to the ink colors that are available in the printer. One type of printer forms images using cyan, magenta, yellow, and black (CMYK) inks. The printer reproduces a wide range of colors by interspersing small drops of the basic CMYK colors on the print medium in halftone or dithered ink drop patterns. The human eye perceives different colors from the combination of the CMYK colors. Existing standards, which include profiles from the International Color Consortium (ICC), are used to covert image data from an input color space into a color space that is used to eject ink drops from the inkjets to form the printed images.

The image data for many printed images specify one or more "spot colors." As used herein, the term "spot color" refers to a specific color that is reproduced in a printed image with high accuracy. While a color printer generates color reproduction for a wide range of colors, the accurate reproduction of a spot color is often very important to the perceived quality of the printed document. In some printers, specific combinations of ink colors such as CMYK inks can reproduce the spot colors.

In many printer configurations, the printer ejects ink drops to form a printed image in a "colorant-limited" operating mode. In an inkjet printer, the operated mode is referred to as an "ink-limited" operating mode, while in a xerographic printer the mode may be referred as a "toner-limited" operating mode. That is to say, the printer forms printed images using a reduced amount of colorant compared to the maximum operating limits of the printer. Examples of ink limiting include limiting the proportion of the image receiving surface that can be covered with ink in a predetermined pattern to reproduce a color or to limit the total mass of ink that is printed in a predetermined location to reproduce the color. Printers operate in the ink-limited modes to, for example, reduce the total amount of ink that is consumed during a print job, prevent ink oversaturation of a print medium such as paper, and prevent excess ink from offsetting from the print medium to the components in the printer. The printer uses an ink-limited color profile to convert color coordinates in the device independent color space to a gamut of CMYK ink patterns that can be printed on the medium without exceeding the ink consumption limits.

In inkjet printers, ink-limited operating modes are unable to reproduce some spot colors. More generally, in color printers that use ink, toner, or other colorant materials, the colorant-limited operating modes can prevent the reproduction of some spot colors. For example, if a spot color for red requires a density of magenta and yellow inks that exceed the maximum ink density in the ink-limited profile, then the printer approximates the spot color using reduced amounts of the magenta and yellow inks. While the approximated colors in a colorant-limited gamut are acceptable for many printed images, the printer produces unacceptably inaccurate spot color approximates in the colorant-limited printing mode. Consequently, improvements to the operation of printers, including but not limited to inkjet printers, to generate printed images using colorant-limited printer modes while also reproducing spot colors with improved accuracy would be beneficial.

SUMMARY

In one embodiment, a method of operating an inkjet printer that prints spot colors with a full color profile in a printer model while printing colors other than spot colors with an ink-limited printer model has been developed. The method includes identifying first coordinates in a device independent color space corresponding to a first printed color in image data, identifying first color components in a full color profile that includes an association between the first coordinates in the device independent color space and a full color device dependent color space for the printer in response to the first printed color being a predetermined spot color, and emitting a plurality of colorants with reference to the first color components to form a first printed pattern on an image receiving surface, the first printed pattern having a colorant density exceeding a predetermined colorant limit threshold associated with printed colors other than spot colors.

In another embodiment, a method of operating an inkjet printer that prints spot colors using a modified ink-limited printer model has been developed. The method includes identifying color components in a device dependent color space corresponding to a predetermined spot color using a full color model for the printer, increasing a colorant limit threshold in a colorant limit profile to correspond to the identified color components of the spot color in response to the identified coordinates of the spot color exceeding a default colorant limit threshold in the colorant limit profile, the colorant limit profile including a plurality of colorant limit thresholds corresponding to a plurality of entries in the full color model, generating a colorant-limited model for the printer with the colorant limit profile and the full color model, the colorant-limited model including color components in the device dependent color space that are less than the default colorant limit for a first plurality of colors and correspond to the increased colorant limit for the spot color, and emitting a plurality of colorants onto an image receiving surface with reference to image data and the colorant-limited model, the printed image including a first printed color formed on the image receiving surface with a first colorant density that is below the default colorant limit threshold and the spot color formed on the image receiving surface with a second density that corresponds to the increased limit for the spot color.

In another embodiment, a printer that forms spot colors with a full color printer model and non-spot colors with a colorant limited printer model has been developed. The printer includes a colorant emitter configured to emit a plurality of colorants onto an image receiving surface, a memory, and a controller operatively connected to the colorant emitter and the memory. The memory is configured to store data corresponding to coordinates in a device independent color space, a full color profile that includes an association between coordinates in the device independent color space that correspond to a predetermined spot color and a full color device dependent color space for the printer, and a colorant-limited color profile that includes an association between coordinates in the device independent color space that correspond to a plurality of colors other than the predetermined spot color and a colorant-limited device dependent color space for the printer. The is configured to receive image data including a first printed color and a second printed color, identify first color components in the full color profile in response to the first printed color being the predetermined spot color, and operate the colorant emitter to eject a plurality of colorants with reference to the first color components to form a first printed pattern on the image receiving surface, the first printed pattern having a colorant density exceeding a predetermined colorant limit threshold, identify second color components in the colorant-limited color profile in response to the second printed color being a color other than the predetermined spot color, and operate the colorant emitter to emit a second plurality of colorants with reference to the second color components to form a second printed pattern on the image receiving surface, the second printed pattern having a colorant density that is less than the predetermined colorant limit threshold.

BRIEF DESCRIPTION OF THE DRAWINGS

The foregoing aspects and other features of a printer that generates printed images with a colorant-limited printer model and spot colors are explained in the following description, taken in connection with the accompanying drawings.

DETAILED DESCRIPTION

Figure 1:
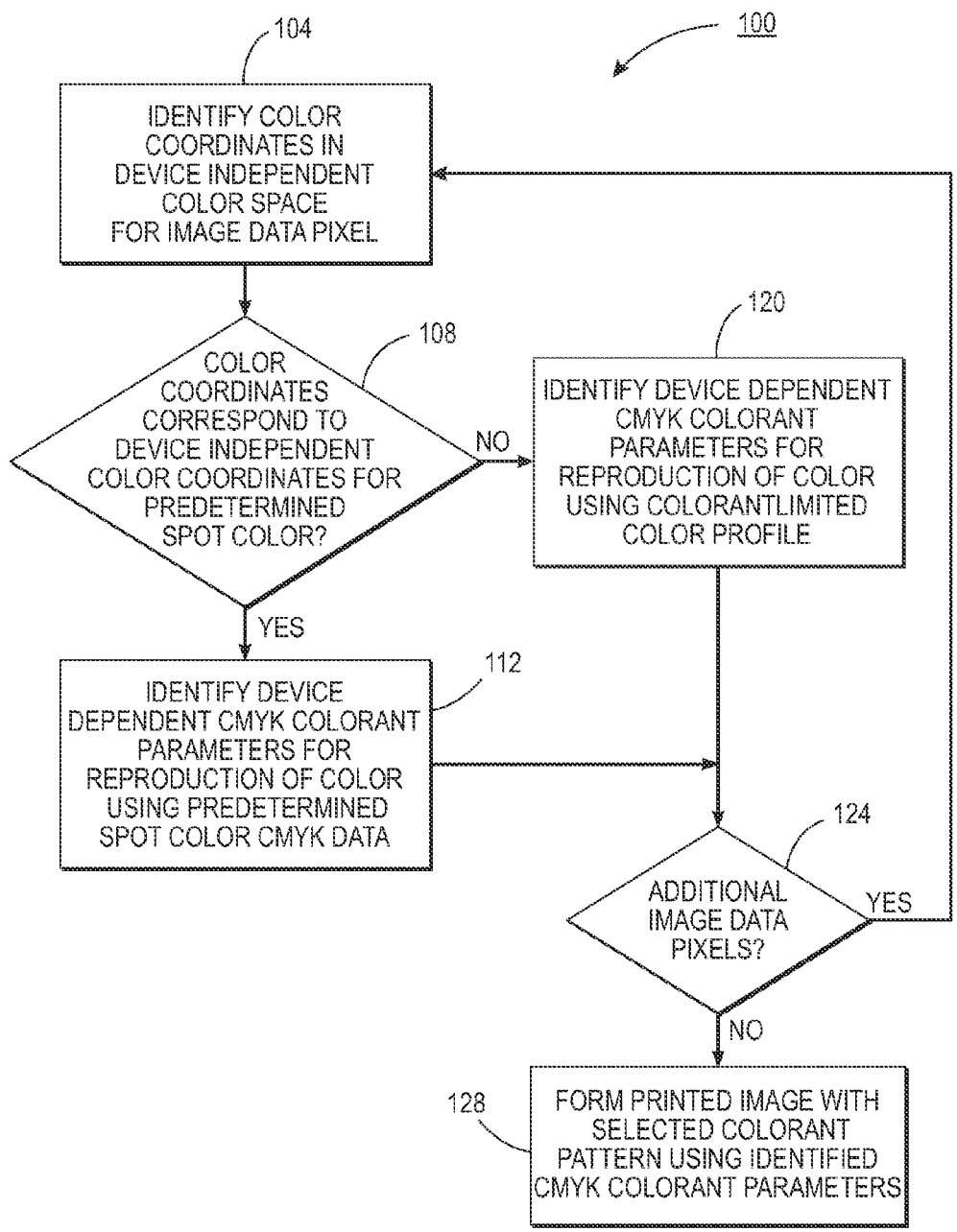
FIG. 1 is a block diagram of a process for forming a printed image including both spot colors and other ink colors in a color profile for a colorant-limited printer model.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that produces images with colorants on media, such as digital copiers, bookmaking machines, facsimile machines, multi-function machines, etc.

As used herein, the term "colorant" refers to ink, toner, or any other substance that produces a color in a printed image. Multicolor printers often use a mixture of colorants, such as cyan, magenta, yellow, and black colorants, to reproduce a wide range of perceptible colors. Inkjet printers use one or more inks, including aqueous, solvent-based, and phase-change inks as colorants. In an inkjet printer, one or more printheads act as colorant emitters that eject drops of the colorant (ink) using a plurality of inkjets directly onto a print medium image receiving surface or onto an indirect image receiving surface such as a drum or endless belt. Xerographic printers emit toner particles as colorants. In the xerographic printer, the emission of colorant is controlled by toner applicators for one or more colors of toner and a controlled distribution of charge on an imaging member, such as a drum or belt. One embodiment of a xerographic printer is a laser-printer, in which a laser light source controls the distribution of charge on the imaging member. The strength of the electrostatic charge on different regions of the imaging surface and the rate at which the toner applicators apply the toner particles affects toner density in the printed image.

As used herein, the term "color space" refers to a numeric space used to describe a plurality of colors. Examples of color spaces include $L^*a^*b^*$; and red, green, blue (RGB) color spaces. One particular example of an RGB color space is the "standard RGB" (sRGB) color space that is used in many applications including digital imaging and display using LCD display panels and other display devices. A color is typically identified with multiple numeric component values taken from each of a plurality of axes in the color space. For example, a color is represented as a coordinate with numeric value for each of the $L^*$ (lightness), $a^*$ (green-magenta), and $b^*$ (blue-yellow) axes in the color space. Similarly, a color is represented by three numeric values corresponding to red, green, and blue component values in an RGB space. When viewed as a multi-dimensional space, each set of coordinates in the color space corresponds to a single color. A single color that is represented in one color space can be mapped to a similar or equivalent color in another color space using transformation techniques that are known to the art.

A subset of a color space is referred to as a "color gamut." An imaging device, such as a printer, can generate images with colors in a particular color gamut of the color space. The color space is typically larger than the color gamut that can be reproduced by a particular printer. A color gamut can be represented visually as a three dimensional volume in the color space, with points on the surface and interior of the volume corresponding to colors that the printer can reproduce, and points outside of the volume corresponding to colors that the printer cannot reproduce. A color in the color space that is outside the gamut can be associated with a color in the gamut that has a similar hue value to enable the printer to print approximations of colors that are outside of the gamut with minimal distortion to the out-of-gamut colors. An out-of-gamut color can be mapped to a color on the outer surface of the gamut, which corresponds to the color space coordinates defining the outer boundary of the color space that can be reproduce by the printer.

As used herein, the terms "color printer model" and "printer model" are used interchangeably and refer to a relationship between colors that a printer can reproduce with reference to different combinations of physical marking agents, such as different inks, and the perceived colors of the resulting marks in a device independent color space. Different types of printers have different device dependent printer models, and even different instances of the same type of printer can have different device dependent printer models due to variations in the operating characteristics of the individual printing devices. An exemplary printer model described herein is directed to a printer that forms ink images with cyan, magenta, yellow, and black (CMYK) inks, typically on a paper substrate with a white color. The printer model can include multi-dimensional lookup tables (LUTs) or other data structures that store data corresponding to the CMYK ink colors used in the printer and mapping the CMYK ink colors to perceived colors in a device independent color space such as the L*a*b* or sRGB color spaces.

As used herein, the terms "full color profile" or "full color printer model" both refer to a color profile in a printer model that includes all of the possible combinations of inks mapped to the device independent color space. The full color profile for a printer model typically corresponds to a physical printing device such as an inkjet printer. In some configurations, the full color profile in the printer model includes some CMYK LUT indices corresponding to CMYK colors that are printed with an ink density that is too large for practical use during regular printing operations. A printer model that corresponds to an "ink-limited" printer, also referred to as an "ink-limited profile" or "ink limited printer model", refers to a CMYK to independent color space mapping, such as a L*a*b* LUT, for a printer that can only form ink images using CMYK inks having a limited ink mass density. The terms "colorant-limited profile" or "colorant limited printer model" for a printer have the same meaning as the ink-limited profile in an inkjet printer and also refer to other colorants used in different printer embodiments, such as toners that are used in xerographic printers. The term "ink limit" refers to a physical limit on the volume of ink that a printer is configured to print over a given area of a print medium, and the ink limit is often lower than the maximum volume of ink that the inkjets in the printer are capable of printing on the print medium. The term "colorant limit" has the same meaning as the term "ink limit" in an inkjet printer and more broadly refers to limits on other types of colorants that are used in different printer embodiments, such as toner colorants that are used in xerographic printers.

The ink-limited printer model LUT includes the full range of possible CMYK index values that are included in the full color printer model. The device independent color values held in the ink-limited printer model LUT, however, only correspond to the colors in the device independent space that can be produced by constraining the actual ink mass density of the printed ink to within a predetermined maximum limit. The ink-limited printer model can correspond to a specially configured physical printer that only prints ink images within a limited range ink densities, or to a so-called "pseudo" printer that is not implemented as a physical device, but has operating characteristics that can be emulated by reconfiguring a physical printer.

As used herein, the terms "color component" and "color component values" refer to numeric values corresponding to an amount of a particular ink that a printer uses to reproduce a selected color in the device specific printer model. In an exemplary CMYK printer with 8 bit resolution for each ink color, the cyan, magenta, yellow, and black colors are each assigned a numeric value such as an integer value of between 0 and 255. The printer ejects ink drops using each of the CMYK inks in proportion to the numeric color component value. For example, the printer ejects different amounts of inks in combination with reference to values of C=50, Y=130, M=0, and K=40. In the example color, the magenta color component is zero, so the printer does not use any magenta ink to form the color. The printer prints the cyan, yellow, and black inks in proportion to the numeric color component values of the other inks, with yellow ink being printed in the largest amount for the example color. Alternative printer embodiments use integer or floating point numbers with lower or higher resolutions to represent color components. For example, in one alternative embodiment each color component value is represented as a percentage value between 0% and 100%.

The colors in image data that a printer processes during a print job are expressed in the color coordinates of a device independent color space such as the sRGB or L*a*b* color space. In order to print images with the colors defined in image data, the color coordinates of the device independent colors need to be converted into the color component values corresponding to ink colors of the printer producing the ink image. Printers include color profile mappings, such as international color consortium (ICC) profiles, which map colors in a device independent color space to the ink colors used by the printer. A color profile mapping and a printer model can be related to each other since a printer model maps ink colors used by the printer to the device independent color space, and the color profile maps colors from the device independent color space to ink colors used by the printer.

A reference to a gamut of a particular printer refers to colors in the device independent color space that correspond to the device independent colors that are included in the printer model. As described above, since the printer model and associated color gamut typically includes fewer colors than are present in a larger color space, various transformation techniques are used in existing printers to map colors in the color space to the narrower color gamut. Identified colors in the color gamut are then converted to colors in the printer model using the color profile mapping to control the ejection of different colored ink drops to reproduce the color.

As used herein, the term "ink mass density" refers to a density of ink formed on a print medium, such as paper, in order to reproduce a particular color in the printer model. The ink mass density refers to the density of ink on the paper for printing a solid area of the color over a comparatively large portion of the print medium. For example, the ink mass density of a particular color is 4 milligrams (mg) per square inch when a continuous area of the print medium is printed with one or more inks that form the color on the print medium. In an inkjet printer, if the ink mass density on the print medium exceeds a predetermined operating limit, then the print medium may jam or ink may offset from the print medium as the printer handles the print medium. The terms "ink mass density limit" and "ink mass density threshold" are used interchangeably and refer to a maximum ink mass density that a printer is configured to use during operation. Processes that are described below generate a profile to a corresponding device independent color gamut based on an ink mass density limit so that the printer prints a wide range of colors while preventing an over-accumulation of ink on the print medium.

Figure 3:
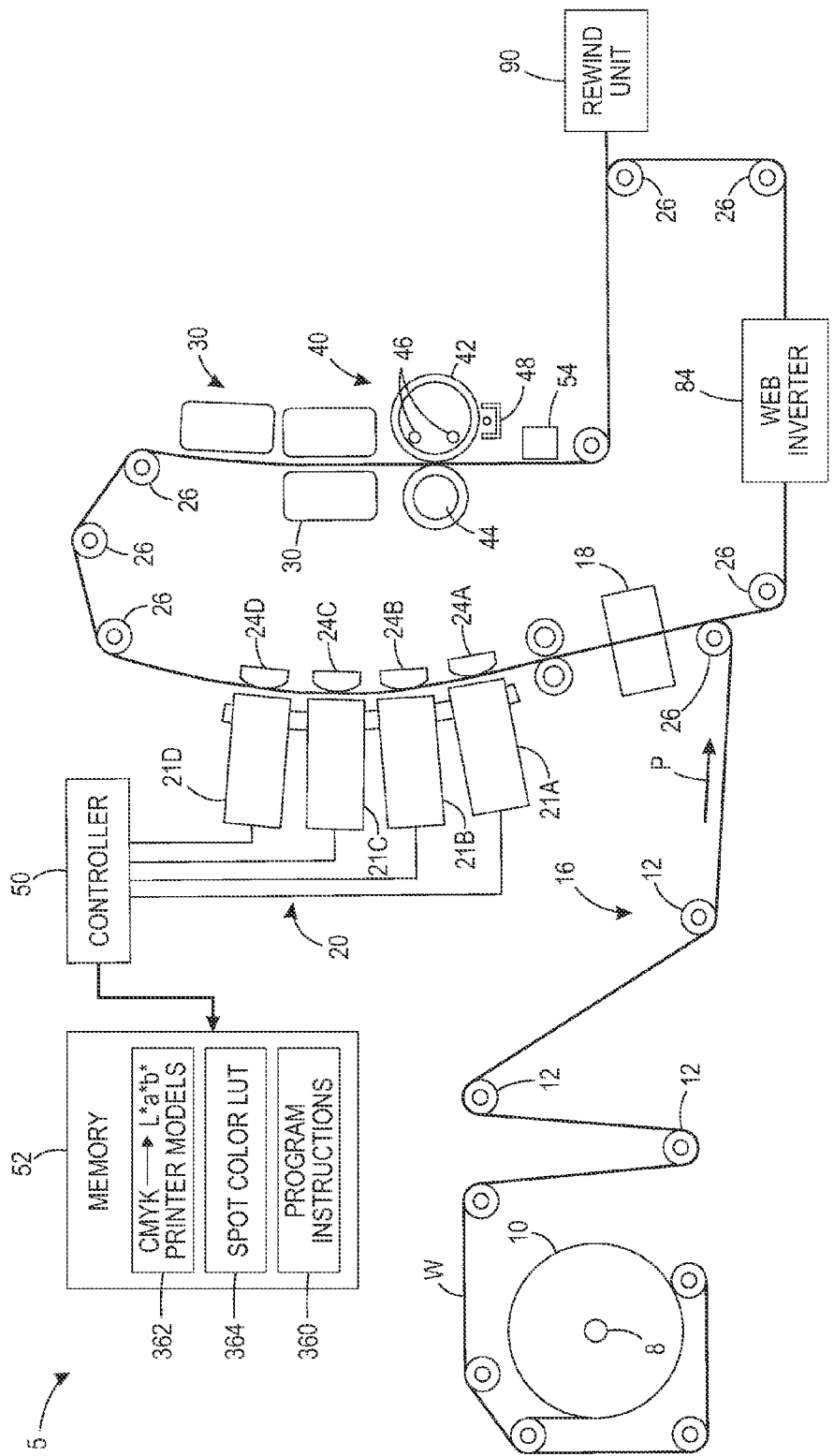
FIG. 3 is a schematic diagram of an inkjet printer that is configured to form printed images including spot colors during ink-limited printing modes.

FIG. 3 depicts an inkjet printer 5. For the purposes of this disclosure, an inkjet printer employs one or more inkjet printheads to eject drops of ink into an image receiving member, such as paper, another print medium, or an indirect member such as a rotating image drum or belt. The printer 5 is configured to print ink images with a "phase-change ink," by which is meant an ink that is substantially solid at room temperature and that transitions to a liquid state when heated to a phase change ink melting temperature for jetting onto the imaging receiving member surface. The phase change ink melting temperature is any temperature that is capable of melting solid phase change ink into liquid or molten form. In one embodiment, the phase change ink melting temperature is approximately 70° C. to 140° C. In alternative embodiments, the ink utilized in the printer comprises UV curable gel ink. Gel inks are also heated before being ejected by the inkjet ejectors of the printhead. As used herein, liquid ink refers to melted phase change ink, heated gel ink, or other forms of ink, such as aqueous inks, ink emulsions, ink suspensions, ink solutions, or the like.

The printer 5 includes a controller 50 to process the image data before generating the control signals for the inkjet ejectors to eject colorants. Colorants can be ink, or any suitable substance that includes one or more dyes or pigments and that is applied to the selected media. The colorant can be black or any other desired color, and some printer configurations apply a plurality of distinct colorants to the media. In the configuration of FIG. 3, the printer 5 ejects cyan, magenta, yellow, and black (CMYK) inks onto the media web to form color ink images. The media includes any of a variety of substrates, including plain paper, coated paper, glossy paper, or transparencies, among others, and the media can be available in sheets, rolls, or other physical formats.

The printer 5 is an example of a direct-to-sheet, continuous-media, phase-change inkjet printer that includes a media supply and handling system configured to supply a long (i.e., substantially continuous) web of media W of "substrate" (paper, plastic, or other printable material) from a media source, such as spool of media 10 mounted on a web roller 8. For simplex printing, the printer 5 passes the media web W through a media conditioner 16, print zone 20, and rewind unit 90 once. In the simplex operation, the media source 10 has a width that substantially covers the width of the rollers over which the media travels through the printer.

For duplex operations, the web inverter 84 flips the media web W over to present a second side of the media to the print zone 20, before being taken up by the rewind unit 90. In duplex operation, the media source is approximately one-half of the roller widths as the web travels over one-half of the surface of each roller 26 in the print zone 20. The inverter 84 flips and laterally displaces the media web W and the media web W subsequently travels over the other half of the surface of each roller 26 opposite the print zone 20, for printing and conditioning of the reverse side of the media web W. The rewind unit 90 is configured to wind the web onto a roller for removal from the printer and subsequent processing.

In another duplex printing configuration, two printers with the configuration of the printer 5 are arranged serially with a web inverter interposed between the two printers to perform duplex printing operations. In the serial printing arrangement, the first printer forms and fixes an image on one side of a web, the inverter turns the web over, and the second printer forms and fixes an image on the second side of the web. In the serial duplex printing configuration, the width of the media web W can substantially cover the width of the rollers in both printers over which the media travels during duplex printing.

The media web W is unwound from the source 10 as needed and a variety of motors, not shown, rotate one or more rollers 12 and 26 to propel the media web W. The media conditioner includes rollers 12 and a pre-heater 18. The rollers 12 and 26 control the tension of the unwinding media as the media moves along a path through the printer. In alternative embodiments, the printer transports a cut sheet media through the print zone in which case the media supply and handling system includes any suitable device or structure to enable the transport of cut media sheets along a desired path through the printer. The pre-heater 18 brings the web to an initial predetermined temperature that is selected for desired image characteristics corresponding to the type of media being printed as well as the type, colors, and number of inks being used. The pre-heater 18 can use contact, radiant, conductive, or convective heat to bring the media to a target preheat temperature, which in one practical embodiment, is in a range of about 30° C. to about 70° C.

The media is transported through a print zone 20 that includes a series of color printhead modules or units 21A, 21B, 21C, and 21D, each printhead unit effectively extends across the width of the media and is able to eject ink directly (i.e., without use of an intermediate or offset member) onto the moving media. In printer 5, each of the printheads ejects a single color of ink, one for each of the colors typically used in color printing, namely, cyan, magenta, yellow, and black (CMYK) for printhead units 21A, 21B, 21C, and 21D, respectively. The controller 50 of the printer receives velocity data from encoders mounted proximately to rollers positioned on either side of the portion of the path opposite the four printheads to calculate the linear velocity and position of the web as the web moves past the printheads. The controller 50 uses these data to generate firing signals for actuating the inkjet ejectors in the printheads to enable the printheads to eject four colors of ink with appropriate timing and accuracy for registration of the differently colored patterns to form color images on the media. The inkjet ejectors actuated by the firing signals correspond to digital data processed by the controller 50. The digital data for the images to be printed can be transmitted to the printer, generated by a scanner (not shown) that is a component of the printer, or otherwise generated and delivered to the printer. In various configurations, a color module for each primary color includes one or more printheads; multiple printheads in a module are formed into a single row or multiple row array; printheads of a multiple row array are staggered; a printhead prints more than one color; or the printheads or portions thereof are mounted movably in a direction transverse to the process direction P for printing operations, such as for spot-color applications and the like. While the printhead units in the printer 5 are configured to eject liquid drops of a phase change ink onto the media web W, a similar configuration of inkjets that print solvent inks, aqueous inks, or any other liquid ink can be used to generate color ink images as described herein.

Associated with each color module is a backing member 24A-24D, typically in the form of a bar or roll, which is arranged substantially opposite the printhead on the back side of the media. Each backing member positions the media at a predetermined distance from the printhead opposite the backing member. The backing members 24A-24D are optionally configured to emit thermal energy to heat the media to a predetermined temperature, which is in a range of about 40° C. to about 60° C. in printer 5. The various backer members can be controlled individually or collectively. The pre-heater 18, the printheads, backing members 24A-24D (if heated), as well as the surrounding air combine to maintain the media along the portion of the path opposite the print zone 20 in a predetermined temperature range of about 40° C. to 70° C.

As the partially-imaged media web W moves to receive inks of various colors from the printheads of the print zone 20, the printer 5 maintains the temperature of the media web within a given range. The printheads in the color modules 21A-21D eject ink at a temperature typically significantly higher than the temperature of the media web W. Consequently, the ink heats the media, and temperature control devices can maintain the media web temperature within a predetermined range. For example, the air temperature and air flow rate behind and in front of the media web W impacts the media temperature. Accordingly, air blowers or fans can be utilized to facilitate control of the media temperature. Thus, the printer 5 maintains the temperature of the media web W within an appropriate range for the jetting of all inks from the printheads of the print zone 20. Temperature sensors (not shown) can be positioned along this portion of the media path to enable regulation of the media temperature.

Following the print zone 20 along the media path are one or more "mid-heaters" 30. A mid-heater 30 can use contact, radiant, conductive, and/or convective heat to control a temperature of the media. The mid-heater 30 brings the ink placed on the media to a temperature suitable for desired properties when the ink on the media is sent through the fixing assembly 40. In one embodiment, a useful range for a target temperature for the mid-heater is about 35° C. to about 80° C. The mid-heater 30 has the effect of equalizing the ink and substrate temperatures to within about 15° C. of each other. Lower ink temperature gives less line spread while higher ink temperature causes show-through (visibility of the image from the other side of the print). The mid-heater 30 adjusts substrate and ink temperatures to 0° C. to 20° C. above the temperature of the spreader in the fixing assembly 40.

Following the mid-heaters 30, a fixing assembly 40 applies heat and/or pressure to the media to fix the images to the media. The fixing assembly includes any suitable device or apparatus for fixing images to the media including heated or unheated pressure rollers, radiant heaters, heat lamps, and the like. In the embodiment of the FIG. 3, the fixing assembly 40 includes a "spreader", that applies a predetermined pressure, and in some implementations, heat, to the media. The function of the spreader in the fixing assembly 40 is to flatten the individual ink droplets, strings of ink droplets, or lines of ink on web W and flatten the ink with pressure and, in some systems, heat. The spreader flattens the ink drops to fill spaces between adjacent drops and form uniform images on the media web W. In addition to spreading the ink, the fixing assembly 40 improves fixation of the ink image to the media web W by increasing ink layer cohesion and/or increasing the ink-web adhesion. The spreader includes rollers, such as image-side roller 42 and pressure roller 44, to apply heat and pressure to the media. Either roller can include heat elements, such as heating elements 46, to bring the web W to a temperature in a range from about 35° C. to about 80° C. In alternative embodiments, the fixing assembly spreads the ink using non-contact heating (without pressure) of the media after the print zone 20. Such a non-contact fixing assembly can use any suitable type of heater to heat the media to a desired temperature, such as a radiant heater, UV heating lamps, and the like.

In one practical embodiment, the roller temperature in the fixing assembly 40 is maintained at an optimum temperature that depends on the properties of the ink, such as 55° C. Generally, a lower roller temperature gives less line spread while a higher temperature produces imperfections in the gloss of the ink image. Roller temperatures that are too high may cause ink to offset to the roll. In one practical embodiment, the nip pressure is set in a range of about 500 to about 2000 psi lbs./side. Lower nip pressure produces less line spread while higher pressure may reduce pressure roller life.

The fixing assembly 40 can include a cleaning/oiling station 48 associated with image-side roller 42. The station 48 cleans and/or applies a layer of some release agent or other material to the roller surface. The release agent material can be an amino silicone oil having viscosity of about 10-200 centipoises. A small amount of oil transfers from the station to the media web W, with the printer 5 transferring approximately 1-10 mg per A4 sheet-sized portion of the media web W. In one embodiment, the mid-heater 30 and fixing assembly 40 are combined into a single unit, with their respective functions occurring relative to the same portion of media simultaneously. In another embodiment the media is maintained at a high temperature as the media exits the print zone 20 to enable spreading of the ink.

Following passage through the fixing assembly 40 the printed media can be wound onto a roller for removal from the system (simplex printing) or directed to the web inverter 84 for inversion of the print medium and displacement to another section of the rollers for a second pass by the printheads, mid-heaters, spreader, and coating station. One configuration of the printer 5 winds the simplex or duplex printed media onto a roller for removal from the system by rewind unit 90. Alternatively, the media can be directed to other processing stations that perform tasks such as cutting, binding, collating, and/or stapling the media or the like.

In printer 5, a controller 50 is operatively connected to various subsystems and components to regulate and control operation of the printer 5. The controller 50 is implemented with general or specialized programmable processors that execute programmed instructions. A memory 52 stores programmed instructions 360 and also stores various data used in the configuration and operation of the printer 5. As described below, the memory 52 holds one or more LUTs that store data corresponding to combinations of the CMYK inks that the printer 5 forms on the media web W, and corresponding color coordinates in one or more color spaces such as L*a*b* and sRGB color spaces. In one embodiment, the data are stored as international color consortium (ICC) profiles. The instructions and data required to perform the programmed functions are stored in a memory associated with the processors or controllers.

In the illustrative embodiment of FIG. 3, the memory 52 stores one or more CMYK to device independent color space printer models 362. The printer models 362 are, for example, one or more lookup tables (LUTs) corresponding to a regular four-dimensional hypercube with one dimension for each of the CMYK colors used by the printer 5 mapped to three-dimensional coordinates in the L*a*b* color space, or another device-independent color space. The printer models 362 include both full color CMYK→L*a*b* mappings for the full range of ink densities that the printer 5 can form, and ink-limited mappings where the CMYK combinations are limited to one or more ink density or ink mass limit thresholds. As described below, the printer 5 optionally modifies one or more ink mass limits to enable printing of spot colors using an ink-limited printer model. In the memory 52, the spot color LUT 364 is a simplified printer model that maps between CMYK colors and the device independent color space, but the LUT 364 only includes entries for one or more spot colors. In one operating mode, the printer 5 uses the spot color LUT 364 to identify the CMYK ink combinations for printing spot colors, and uses an ink-limited printer model in the CMYK→L*a*b* mappings 362 for non-spot colors.

The processors, their memories, and interface circuitry configure the controllers and/or print engine to perform the printer operations. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits. The controller 50 is operatively connected to the print bar and printhead motors of color modules 21A-21D in order to generate electrical firing signals for operation of the inkjets to form ink images on the media web W.

The printer 5 includes an optical sensor 54 that is configured in a manner similar to that described above for the imaging of the printed web. The optical sensor is configured to detect, for example, the presence, reflectance values, and/or location of ink drops jetted onto the receiving member by the inkjets of the printhead assembly. The optical sensor 54 includes an array of optical detectors mounted to a bar or other longitudinal structure that extends across the width of an imaging area on the image receiving member. In one embodiment, the optical sensor 54 includes a spectrophotometer that detects light reflected from ink marks that are printed on the media web W using one or more colors of the CMYK inks in a range of densities. The spectrophotometer 54 generates digital data corresponding to the spectra and colors of light reflected from the ink patches, and the controller 50 identifies the correspondence between the data from the spectrophotometer 54 and colors in a device independent color space such as the sRGB or L*a*b* color space. The magnitudes of the electrical signals generated by the optical detectors are converted to digital values by an appropriate analog/digital converter.

The imaging system 5 of FIG. 3 is merely illustrative of one embodiment of an imaging system that forms ink images on a print medium using a device dependent color gamut. Alternative imaging systems include, but are not limited to sheet fed imaging systems, indirect inkjet printers that form latent ink images on a drum or belt prior to transferring the ink image to a print medium, and inkjet printers that use liquid inks instead of phase change inks. While the processes described herein for modifying an ink limit are described in conjunction with inkjet printers, the techniques are also applicable to xerographic printers and other printer embodiments that limit the density of colorant that can be applied to a print medium to reproduce a color. For example, in a xerographic printer a rotating drum receives an electrostatic charge that regulates the distribution of a toner colorant that is attracted to the surface of the drum and subsequently transferred to a print medium. The xerographic printer also includes emitters for one or more colors of toner. The toner is attracted to selected charged regions of the drum surface. The color limiting processes described below are also applicable to the operation of the xerographic printer to increase the density limit of toner that is applied to form spot colors during a printing process.

FIG. 1 depicts a process 100 for printing images using patterns of ink or another marking agent in a color printer that includes an ink-limited color gamut and where a print job includes at least one color that is outside of the ink-limited color gamut. In the discussion below, a reference to the process performing a function or action refers to a controller executing programmed instructions stored in a memory to operate one or more components to perform the function or action. Process 100 is described with reference to the inkjet printer 5 of FIG. 3 for illustrative purposes, but the process 100 is also applicable to other types of printers including xerographic printers.

During process 100, the controller 50 identifies color coordinates in a device independent color space for an image data pixel (block 104). For example, in one configuration a pixel of image data is encoded in a red, green, blue (RGB) device-dependent color space that is commonly used in display monitors. The controller 50 converts the image data from the device dependent color space to a device independent color space, such as the L*a*b* color space, using techniques that are known to the art. In another embodiment, the controller 50 receives image data pixel including color coordinates in the L*a*b* color space without the need to convert from another color space. The L*a*b* color coordinates identify a location of the color for the pixel in the device independent color space. In the L*a*b* color space, the coordinates include three numeric values along each of the L*, a*, and b* axes in a three-dimensional color space.

During process 100, the controller 50 identifies if the color coordinates correspond to device independent coordinates for a predetermined spot color (block 108). As described above, in one embodiment the printer 5 is configured with data corresponding to predetermined spot colors that are used in association with a print job. The particular spot colors that are associated with a print job can vary based on the parameters of the print job. In one embodiment, the memory 52 stores the full color profile in the printer model with a mapping of the L*a*b* color coordinates to the full CMYK ink coordinates without the ink limit. In response to identifying that the L*a*b* coordinates for the pixel correspond to the spot color, the controller 50 identifies CMYK data from the full color profile in the printer model instead of from the ink-limited printer model. The full color profile in the printer model includes a lookup table with three-dimensional index coordinates for the L*a*b* color space that map to the four-dimensional CMYK space. In another embodiment, the memory 52 stores a smaller lookup table that only includes L*a*b* coordinates and corresponding CMYK patterns for the print job or for a limited number of spot colors that are configured for the printer 5.

If the device independent color coordinates for the image data pixel correspond to the spot color, then the controller 50 identifies device dependent color components in a device dependent color space for the printer 5 that identify the spot color in the spot color lookup table (block 112). For example, in the printer 5, the controller 50 identifies CMYK coverage parameters for the inks that are used to form a halftone or dithered printed reproduction of the spot color. In one embodiment, the CMYK color components in the device dependent color space are expressed as numeric values including integers or numeric percentage values to identify the content of each ink in the printed patterns. In another embodiment, if the device independent color coordinates correspond to a predetermined spot color, then the controller 50 identifies the CMYK color components in a full color profile for the printer 5 that maps between the device independent color space and the CMYK color components without any ink limits. As described above, the combination of CMYK inks that produces the spot color can exceed a predetermined ink limit in an ink-limited color profile for the printer 5.

If the device independent color coordinates for the image data pixel do not correspond to a spot color, then the controller 50 identifies device dependent color components that correspond to the color using the ink-limited color profile (block 120). The CMYK color components retrieved from the ink-limited color profile enable reproduction of the color in the device independent color space using a combination of the CMYK inks that remain within the predetermined ink limit for the ink-limited printed model. For example, the identified CMYK color components enable the printer 5 to reproduce the color using a halftone or dithered pattern with the total relative proportion of the image receiving surface that is covered with ink or the total mass of the printed CMYK inks pattern remaining below a predetermined limit.

Process 100 continues for additional pixels of image data to generate CMYK color components for pixels in the printed image (block 124). The controller uses the CMYK color components in the device dependent color space to generate ink drop patterns for each of the cyan, magenta, yellow, and black inks in the printer 5. The generation of halftone or dithered patterns for the different CMYK color components is well known to the art and is not discussed in further detail herein. The inkjets in the printhead units eject the ink drops to form the printed image include colors in the ink-limited color gamut and the spot colors that are generated with ink densities that exceed the limits of the ink-limited color gamut (block 128). In other printer embodiments, the printer emits a colorant to form the printed image using the colorant-limited parameters. In an inkjet printer, the inkjets in one or more printheads eject ink drops to emit the colorant, while in a xerographic printer a toner module emits a toner that adheres to the charged regions of an imaging drum or belt. If the color is a spot color, then the printer emits the colorants according to the colorant-limited model for the particular spot color to enable accurate reproduction of the spot color in the printed image.

The illustrative embodiment of process 100 above depicts generation of CMYK image data to control the operation of inkjets for printing spot colors with printed densities that exceed the predetermined ink limit for other printed colors in a print job. In some instances, the CMYK color components that correspond to the spot color are also within the ink-limited color gamut. In the event that the spot color can be reproduced using the ink-limited CMYK gamut, the process 100 can either use the second lookup table to identify a CMYK printed ink pattern that is within the ink limit, or identify the CMYK pattern in the ink-limited gamut.

In the process 100 described above, the printer identifies CMYK color components corresponding to colors in the device independent color space using both an ink-limited color profile for non-spot colors and another color profile that stores the CMYK color components for spot colors that exceed the limits of the ink ink-limited color profile. In another embodiment, the controller in the printer or another computing device generates a modified ink-limited color profile that increases the ink parameter limit for the spot color and optionally for other colors in the region of the device independent color space around the spot color. Increasing the ink limit for one or more spot colors enables a single ink-limited color profile to store associations between the device independent color space and the device dependent CMYK color components to print spot colors with the full ink coverage required for accurate spot color reproduction, while other printed colors remain within a default ink limit for the color profile.

Figure 2:
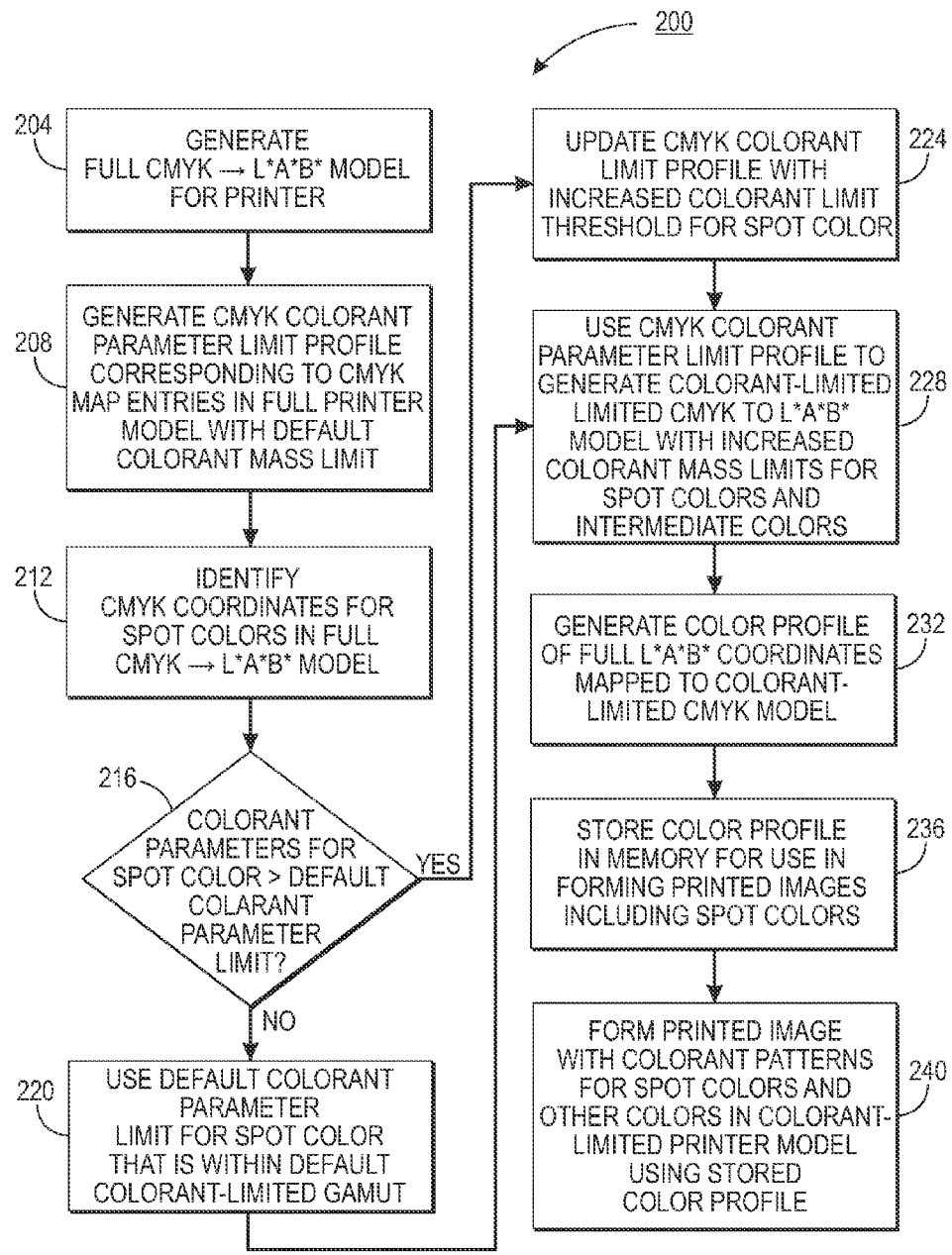
FIG. 2 is a block diagram of a process for forming a color profile with a colorant-limited printer model that is modified to include spot colors that exceed the default limits of the colorant-limited printer model.

FIG. 2 depicts a process 200 for generating a colorant-limited color profile that includes different colorant limit thresholds for the CMYK color components that correspond to different colors, including spot colors, in a device independent color space. In the discussion below, a reference to the process performing a function or action refers to a controller executing programmed instructions stored in a memory to operate one or more components to perform the function or action. Process 200 is described with reference to the inkjet printer 5 of FIG. 3 for illustrative purposes, but the process 200 is also applicable to other types of printers including xerographic printers.

Process 200 begins with generation of a full color profile in the printer model that includes a relationship map between a device dependent color space and a device independent color space (block 204). In the illustrative embodiment of FIG. 2, the device independent color space is the L*a*b* color space and the printer 5 is modeled with CMYK color components in the device dependent color space for the CMYK inks that form printed colors. The full color profile in the printer model includes a full range of CMYK ink patterns that the printheads in the printer 5 are capable of forming, even if the printed ink patterns would be impractical for printing images during a production print job. In one embodiment of process 200, the controller 50 prints a test pattern including printed marks formed with the full range of CMYK color combinations. The test pattern includes both single color marks formed with a single color of ink at various perceptible coverage levels and multi-ink marks that are formed with range of ink combinations using two or more of the CMYK inks. In one configuration, the printer 5 forms a test pattern with approximately 2,000 marks on the media web W, including marks with ink mass densities that are larger than an ink mass density limit that is suitable for use during production printing operations. An optical scanner (not shown) scans the printed colors to generate color coordinates in the L*a*b* color space or another device independent color space for each of the printed marks. Since each mark is formed with a predetermined set of CMYK color components, the controller 50 or another computing device generates a full color profile in the printer model mapping of the predetermined CMYK color components for the printed marks to the L*a*b* color space in a process that is referred to as an "inversion" process since the full color profile in the printer model maps from the device-dependent CMYK space to the device independent L*a*b* color space.

In one embodiment, the full color profile in the printer model from the CMYK color space to the L*a*b* color space is formed as a lookup table (LUT) corresponding to a regular four-dimensional hypercube with one dimension for each of the CMYK colors used by the printer 5 mapped to three-dimensional coordinates in the L*a*b* color space. For example, one full color LUT includes four dimensions of thirteen elements each, for a total of 28,561 ($13^4$) entries, which corresponds to different color component values for each of the CMYK colors. Each CMYK entry contains corresponding coordinates in the L*a*b* color space that correspond to a perceived color of the combination of the CMYK inks at the LUT coordinates. A much larger number of colors can be identified by interpolating between entries in the full color profile in the printer model, so the LUT does not need to contain a separate entry for each color that the printer can reproduce. The ink-limited LUT includes the same 28,561 entries corresponding to the same CMYK values, but the L*a*b* values of some of the CMYK entries may be different from the full color profile in the printer model when the full color profile in the printer model would use a combination of CMYK inks that exceeds the predetermined ink mass density limit for the printer. As described below, an ink limiting transformation identifies alternative L*a*b* values that correspond to ink combinations that the printer 5 can reproduce, while attempting to minimize the distortion to the color. Process 200 identifies different colorant limit levels for different regions of the CMYK color space for different spot colors and intermediate colors.

Process 200 continues with generation of a default CMYK ink parameter limit profile (block 208). The CMYK ink parameter limit profile is a four-dimensional matrix that includes an entry for each of the CMYK entries in the CMYK→L*a*b* LUT that is generated for the full printer model. For example, using the embodiment where the CMYK LUT includes thirteen entries for each of the CMYK colors, the default ink parameter limit profile also includes 28,561 entries. In one embodiment, the default ink parameter limit for each entry corresponds to a maximum CMYK coverage parameter. For example, if the individual CMYK color components are expressed as percentage values from 0% to 100%, then the default ink limit is set in a range of 0% (no ink printed) up to 400% (maximum coverage for all CMYK colors). The coverage parameter limit does not distinguish between different types of ink so, for example, a limit of 150% is exceeded for a combination of 50% cyan, 25% magenta, 40% yellow, and 40% black or for 60% magenta and 100% yellow.

In another embodiment, the default ink parameter limit for each entry corresponds to a total ink mass limit for each CMYK color combination. Since the mass density of CMYK inks compared to visual intensity has a non-linear relationship for different colors, the ink mass density threshold limit enables a broader CMYK ink-limited gamut while still limiting the total mass of ink that is ejected onto a given region of the image receiving surface. The non-linear relationships between ink mass and perceptibility enable some combinations of ink to be below the ink mass limit even if the same combination exceeds the coverage parameter limit. For example, the combination of 60% magenta and 100% yellow exceeds a predetermined ink mass limit, but the combination of 50% cyan, 25% magenta, 40% yellow, and 40% black remains below the same ink mass limit because of the non-linear relationship between perceptibility of an ink color and the mass of ink that generates a given level of perceptibility.

In the embodiment of the printer 5, the mass of black ink that is required to reach a given perceptibility level on a given region of the image receiving surface is less than the masses required for the magenta, cyan, and yellow inks to reach the same perceptibility level. Additionally, as the perceptibility level increases, the marginal mass of ink that is required to reach the higher perceptibility level increases in a non-linear manner. Thus, the mass of ink required to generate a 100% intensity color using all four of the CMYK inks is typically much greater than twice the mass of the same CMYK inks at 50% intensity levels. In one configuration of the printer 5, the memory 52 stores data corresponding to predetermined non-linear relationships between ink mass and the color components for each of the CMYK colors. The controller 50 sets default ink mass limits corresponding to each of the CMYK entries in the LUT, and the controller 50 identifies the ink mass used to generate each color using the non-linear relationship data stored in the memory 52.

The illustrative embodiment of FIG. 2 depicts the process 200 with separate processing to generate the full color profile and an ink-limited profile in the printer model with a predetermined ink limit, but the processing that is described above with reference to blocks 204 and 208 occurs concurrently in another embodiment. For example, the ink limiting process can be applied to limit the density of printed ink patterns that are formed from the CMYK inks to be within a predetermined ink limit threshold that is based on either ink coverage density or printed ink mass density. The printer only forms printed patterns that correspond to the predetermined ink limit to generate an ink-limited printer model that maps CMYK color coordinates to the device independent L*a*b* color space. As described below, the printer model is modified with updated ink limits that enable the printer to form printed spot colors that are outside of the ink limited profile in the printer model.

Process 200 continues as the controller 50 identifies CMYK coordinates in the full CMYK to L*a*b* printer model that correspond to spot colors (block 212). In one embodiment, the controller 50 receives predetermined L*a*b* to CMYK data corresponding to the predetermined spot colors and the controller 50 identifies corresponding coordinates in the LUT for the CMYK to L*a*b* printer model for the spot color. In another embodiment, the spot color is specified in the L*a*b* device independent color space and the controller 50 searches the CMYK to L*a*b* printer model to identify the CMYK coordinates in the full color profile in the printer model that most closely correspond to the L*a*b* coordinates for the spot color. As describe above, the LUT includes a predetermined number of entries that are typically much smaller than the total number of colors that are represented in the CMYK color space. In one embodiment, the controller 50 identifies a single lookup table entry that most closely corresponds to the CMYK color components of the spot color. In another embodiment, the controller 50 identifies multiple entries in the LUT that are proximate to the CMYK color components of the spot color when the CMYK color components for the spot color are located between discrete entries in the LUT.

During process 200, the controller 50 identifies if the CMYK color components for the spot color exceed the default ink limit threshold (block 216). As described above, the controller 50 identifies an area coverage parameter or ink mass parameter for the spot color using the identified CMYK spot color components. In some instances, the identified CMYK color components do not exceed the default ink limit threshold, and the controller 50 does not need to change the default ink mass limit for the corresponding combination of CMYK inks (block 220). If, however, the CMYK color components exceed the default ink limit, then the controller 50 updates the CMYK ink limit profile with an increased limit threshold to accommodate the CMYK color components of the spot color (block 224). For example, in an embodiment where the ink limit profile includes a coverage parameter limit, the controller 50 identifies the sum of the CMYK color components for the spot color and adjusts the coverage parameter limit threshold in the corresponding entry of the ink limit profile to correspond to the spot colors. In an ink mass limited embodiment, the controller 50 increases the ink mass limit for the corresponding entry in the ink limit profile to enable reproduction of the spot color using a combination of CMYK inks with the identified ink mass density.

Process 200 modifies the ink limit profile for one or more spot colors with CMYK color components that exceed the predetermined ink limit parameters for non-spot colors used during a print job. The processing described above with reference to blocks 212-224 is repeated for any additional spot colors.

Process 200 continues with generation of an ink-limited CMYK to L*a*b* printer model using the modified ink limit profile (block 228). During the generation of the ink-limited printer model, the controller 50 compares the CMYK color components in each entry of the full color profile for the printer model to a corresponding ink limit threshold value in the ink limit profile. As described above, both the CMYK color components for the full color profile in the printer model and the ink limit profile includes four-dimensional matrices with corresponding entries. The controller 50 identifies if the color components in the full color profile in the printer model exceed the corresponding ink limit threshold. If the color components in the full color profile in the printer model exceed the parameter, then the controller 50 reduces the CMYK color component values until the color components are within the identified ink-limited threshold. As described above, the ink-limited threshold corresponds to a sum of the color components in one embodiment, while the ink-limited threshold corresponds to a printed ink mass density value in another embodiment. In either configuration, the controller 50 reduces the color components for each of the CMYK inks in a proportional manner to meet the ink-limited threshold while minimizing distortion to the printed color. In another embodiment, the controller 50 applies a gray-component replacement technique to the CMYK color components to reduce the color components. The controller 50 stores ink-limited CMYK color components in an ink-limited printer model in the memory 52.

During the generation of the ink-limited printer model, the controller 50 does not reduce the CMYK color components corresponding to the spot colors. In one configuration, the CMYK color components for the spot color are within the default ink-limited color gamut for the printer. In another configuration, the controller 50 has modified the ink limit profile so that the CMYK color components corresponding to the spot color are below the modified ink limit threshold as described above with reference to the processing of block 224. If the ink mass limit for the CMYK entry corresponding to the spot color is increased, then the effective ink limit for colors in the device dependent color space around the spot color are also increased to a degree. For example, the ink-limited printer model in the printer 5 includes only thirteen entries on each of the CMYK axes of a four-dimensional color space for 28,561 entries in the CMYK color space for both the full color profile in the printer model and ink-limited printer model. The printer 5, however, interpolates between the discrete entries in the printer model to generate printed images with a much larger range of colors than the number of entries in the CMYK color model. When the controller 50 increases the ink threshold limits for one or more of the entries in the CMYK printer model, both the spot color and surrounding intermediate colors are affected by the increase in ink density. Thus, the process 200 generates ink-limited printer models that enable the printer 5 to reproduce spot colors and other colors in the CMYK color space that are similar to the spot colors with ink coverage that exceeds the default ink-limited threshold for the ink-limited printer model.

Process 200 continues by generating an inverted mapping between the colors in the L*a*b* color space and the CMYK values in the ink-limited color model (block 232). In process 200, the L*a*b* color space is represented as a three dimensional matrix with each dimension of the matrix corresponding to one of the L*, a*, and b* coordinates. In one example, the L*a*b* matrix includes dimensions of 33 entries for each of the L*, a*, and b* coordinates for a total of 35,937 ($33^3$) entries. Another embodiment uses a wide gamut RGB color space as the device independent color space. A much larger number of L*a*b* colors and corresponding CMYK colors can be identified by interpolating between entries in the L*a*b* matrix. Each entry in the matrix stores a corresponding set of CMYK coordinates in the ink-limited printer model. In the portion of the L*a*b* matrix that lies inside of the ink-limited color gamut, the mapping back to the CMYK coordinates is a matter of reversing the ink-limited color model to identify a CMYK coordinate given one of the L*a*b* coordinates already in the ink-limited printer model. In some instances, a single L*a*b* color value corresponds to multiple CMYK coordinates in the ink-limited model. When this occurs, existing color inversion techniques can be used to select one of the CMYK coordinates to associate with the L*a*b* coordinate for the L*a*b* to CMYK map.

The ink-limited color gamut occupies only a portion of the larger L*a*b* color space represented by the L*a*b* matrix. Many of the L*a*b* entries do not directly map to a CMYK color in the ink-limited printer model. During the color profile generation process, the controller 50 performs gamut mapping to identify another L*a*b* value that is part of the ink-limited color gamut to approximate the L*a*b* value located outside of the ink-limited gamut. Gamut mapping techniques are known in the art and are not described in detail in this document. Process 200 can be used with gamut mapping techniques that preserve the hue of the out-of-gamut L*a*b* colors when mapping to an in-gamut L*a*b* color. After the gamut mapping, the out-of-gamut L*a*b* color is assigned the same CMYK value from the ink-limited printer model as the corresponding in-gamut L*a*b* color. Consequently, the process 200 generates a three dimensional matrix that represents a large L*a*b* color space with each entry in the matrix including CMYK coordinates that correspond to the ink-limited printer model.

Process 200 continues with storage of the ink-limited color profile is stored in a memory for use in forming printed images (block 236). In the printer 5, the color profile data are stored in the memory 52. While process 200 is described in conjunction with the controller 50 for generation of the ink-limited printer model and generation of the color profile for the printer 5, in another embodiment an external computing devices such as a personal computer (PC) or other digital processing device performs all or a portion of the processing described above. The generation of the color profile in process 200 can be performed prior to the commencement of a print job, and the color profile to the ink-limited gamut including spot colors can be used for multiple printing operations that include the selected spot colors. The printer 5 can store one or more color profiles that include different sets of spot colors based on the color reproduction parameters of different print jobs.

Process 200 continues during a printing operation in which the printer 5 uses the color profile to form printed images including the spot colors and non-spot colors corresponding to the ink-limited printer model (block 240). During the printing operation, the controller 50 receives image data in a device independent color space, such as the L*a*b* color space. The controller 50 uses the coordinates of the device independent colors to identify entries in the color profile and the corresponding CMYK color components for the printer 5 that are stored in the color profile. The controller 50 uses the CMYK color components to form printed patterns of ink drops with the printheads in the print zone 20 to form printed colors using combinations of the CMYK inks. Because the ink-limited printer model has been modified to include the predetermined spot colors, the controller 50 retrieves the full CMYK values for the spot colors from the color profile and forms the spot colors in the same manner as the non-spot colors in the color profile. Thus, after generation of the color profile corresponding to an ink-limited color model with the modified ink limit thresholds to include selected spot colors, the printer 5 reproduces spot colors and non-spot colors using a single color profile during the printing process.

It will be appreciated that variants of the above-disclosed and other features, and functions, or alternatives thereof, may be desirably combined into many other different systems or applications. For example, as described above the colorant limiting processes of FIG. 1 and FIG. 2 are applicable to a wide range of printers including inkjet and xerographic printers. Various presently unforeseen or unanticipated alternatives, modifications, variations, or improvements therein may be subsequently made by those skilled in the art, which are also intended to be encompassed by the following claims.

What is claimed is:
1. A method of operating a printer comprising:
   identifying first coordinates in a device independent color space corresponding to a first printed color in image data;
   identifying first color components in a full color profile that includes an association between the first coordinates in the device independent color space and a full color device dependent color space for the printer in response to the first printed color being a predetermined spot color; and emitting a plurality of colorants with reference to the first color components to form a first printed pattern on an image receiving surface, the first printed pattern having a colorant density exceeding a predetermined colorant limit threshold associated with printed colors other than spot colors.

2. The method of claim 1 the emission of the plurality of colorants further comprising:

ejecting a plurality of ink drops with reference to the first color components to form a first printed ink pattern on the image receiving surface, the first printed ink pattern having an ink density exceeding a predetermined ink limit threshold associated with printed colors other than spot colors.

3. The method of claim 2, the ejection of the plurality of ink drops to form the first ink pattern further comprising:

ejecting the plurality of ink drops including at least one of a cyan, magenta, yellow, and black ink from a plurality of inkjets onto the image receiving surface.

4. The method of claim 1 further comprising:

identifying second coordinates in the device independent color space corresponding to a second printed color in the image data;

identifying second color components in a colorant-limited color profile that includes an association between the second coordinates in the device independent color space and a colorant-limited device dependent color space for the printer in response to the second printed color not being a predetermined spot color; and emitting another plurality of colorants to form a second printed pattern on the image receiving surface, the second printed pattern having a colorant density that is less than the predetermined colorant limit threshold.

5. The method of claim 4, the identification of the first color components further comprising:

identifying a presence of the first coordinates in a lookup table corresponding to the full color profile, the lookup table storing coordinates in the device independent color space in association with the color components in the device dependent full color space for only spot colors associated with the image data.

6. The method of claim 5 further comprising:

identifying the second color components in the colorant-limited color profile in response to the second coordinates in the device independent color space not being present in the lookup table.

7. A method of operating a printer comprising:

identifying color components in a device dependent color space corresponding to a predetermined spot color using a full color profile for the printer;

increasing a colorant limit threshold in a colorant limit profile to correspond to the identified color components of the spot color in response to the identified coordinates of the spot color exceeding a default colorant limit threshold in the colorant limit profile, the colorant limit profile including a plurality of colorant limit thresholds corresponding to a plurality of entries in the full color profile;

generating a colorant-limited profile for the printer with the colorant limit profile and the full color profile, the colorant-limited profile including color components in the device dependent color space that are less than the default colorant limit for a first plurality of colors and correspond to the increased colorant limit for the spot color; and emitting a plurality of colorants onto an image receiving surface with reference to image data and the colorant-limited profile, the printed image including a first printed color formed on the image receiving surface with a first colorant density that is below the default colorant limit threshold and the spot color formed on the image receiving surface with a second density that corresponds to the increased limit for the spot color.

8. The method of claim 7 the emission of the plurality of colorants further comprising:

ejecting a plurality of ink drops with reference to the first color components to form a first printed ink image on the image receiving surface, the printed ink image including a first printed color formed on the image receiving surface with a first ink density that is below a default ink limit threshold and the spot color formed on the image receiving surface with a second ink density that corresponds to the increased limit for the spot color.

9. The method of claim 8, the ejection of the plurality of ink drops to form the first ink image further comprising:

ejecting the plurality of ink drops including at least one of a cyan, magenta, yellow, and black ink from a plurality of inkjets onto the image receiving surface.

10. The method of claim 7, the generation of the colorant-limited profile further comprising:

identifying an entry in the full color profile corresponding to coordinates in a device dependent color space for the printer;

identifying a plurality of color components in the entry corresponding to a plurality of colorants used in the printer;

identifying a colorant limit from a plurality of colorant limits in the colorant limit profile, the colorant limit corresponding to the coordinates in the device dependent color space for the identified entry in the full color profile;

reducing the plurality of color components in the entry in response to the plurality of color components exceeding the identified colorant limit; and storing the reduced plurality of color components in another entry corresponding to the coordinates in the device dependent color space in the colorant-limited profile for the printer.

11. The method of claim 7, the colorant limit threshold in the colorant limit profile corresponding to a colorant mass density of a plurality of colorants in the printer that are formed on an image receiving surface in response to the identified color components of the spot color.

12. The method of claim 7, the colorant limit threshold in the colorant limit profile corresponding to a sum of the identified color components of the spot color.

13. The method of claim 7 wherein the color components in the device dependent color space corresponding to the spot color include component values for cyan, magenta, yellow, and black (CMYK) colorants.

14. The method of claim 13, the emission of the colorants further comprising:

identifying a first pattern of colorants corresponding to color components in the colorant-limited profile for the CMYK colorants for the predetermined spot color; and emitting the plurality of colorants including the CMYK colorants onto the image receiving surface in the first pattern to form the spot color on the image receiving surface.

15. The method of claim 7 further comprising:
generating a color profile including a mapping between a device independent color space and the colorant-limited printer profile in the device dependent color space;
identifying colors in the device independent color space in the image data; and
emitting the plurality of colorants to form the printed image with reference to color components in the colorant-limited printer profile that are identified with reference to the image data in the device independent color space and the color profile.

16. A printer comprising:
a colorant emitter configured to emit a plurality of colorants onto an image receiving surface;
a memory configured to store:
  data corresponding to coordinates in a device independent color space;
  a full color profile that includes an association between coordinates in the device independent color space that correspond to a predetermined spot color and a full color device dependent color space for the printer; and
  a colorant-limited color profile that includes an association between coordinates in the device independent color space that correspond to a plurality of colors other than the predetermined spot color and a colorant-limited device dependent color space for the printer; and
a controller operatively connected to the colorant emitter and the memory, the controller being configured to:
  receive image data including a first printed color and a second printed color;
  identify first color components in the full color profile in response to the first printed color being the predetermined spot color; and
  operate the colorant emitter to eject a plurality of colorants with reference to the first color components to form a first printed pattern on the image receiving surface, the first printed pattern having a colorant density exceeding a predetermined colorant limit threshold;
  identify second color components in the colorant-limited color profile in response to the second printed color being a color other than the predetermined spot color; and
  operate the colorant emitter to emit a second plurality of colorants with reference to the second color components to form a second printed pattern on the image receiving surface, the second printed pattern having a colorant density that is less than the predetermined colorant limit threshold.

17. The printer of claim 16, the colorant emitter further comprising:
a plurality of inkjets configured to eject a plurality of ink drops onto the image receiving surface.

18. The printer of claim 16, the full color profile further comprising:
a lookup table stored in the memory including coordinates in the device independent color space in association with the color components in a device dependent full color profile for the predetermined spot color associated with the image data.

* * * * *